Feb. 26, 1924.　　　　　　　　　　　　　　　1,484,928
R. C. BENNER
STORAGE CELL ELECTRODE AND SUPPORT FOR ACTIVE MATERIALS
Filed Oct. 12, 1922
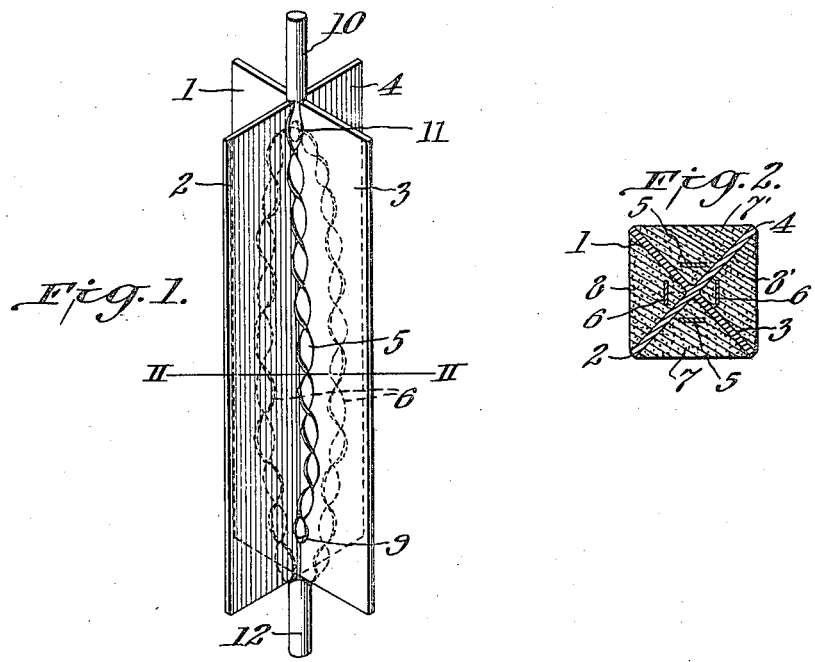
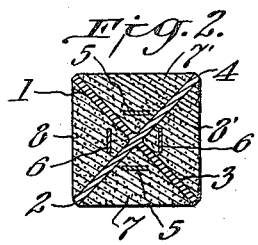
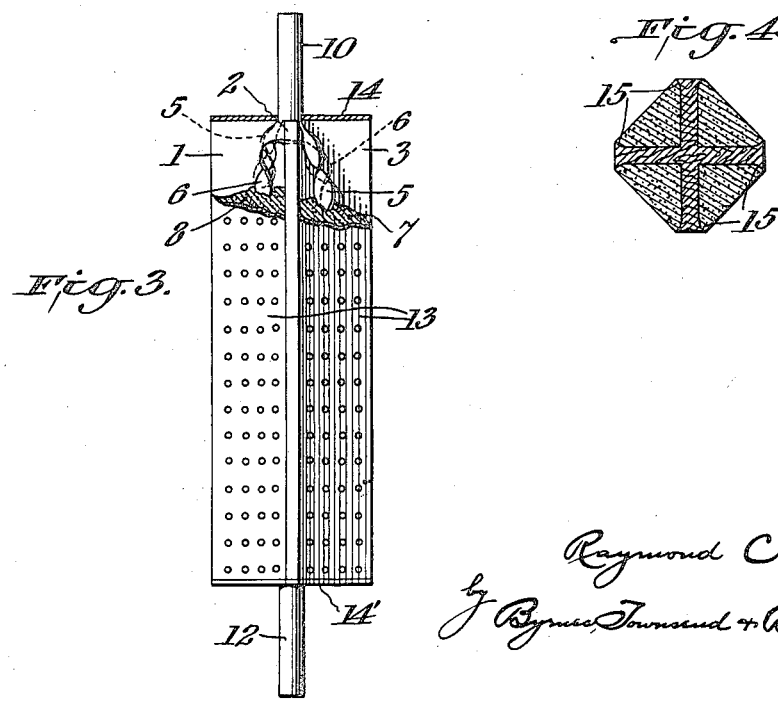
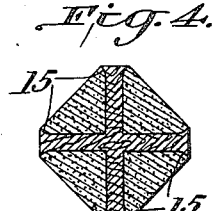
Inventor:
Raymond C. Benner,
by Byrnes, Townsend & Brickenstein,
Attorneys.

Patented Feb. 26, 1924.

1,484,928

UNITED STATES PATENT OFFICE.

RAYMOND C. BENNER, OF BAYSIDE, NEW YORK, ASSIGNOR TO UNION CARBIDE & CARBON RESEARCH LABORATORIES, INC., A CORPORATION OF NEW YORK.

STORAGE-CELL ELECTRODE AND SUPPORT FOR ACTIVE MATERIALS.

Application filed October 12, 1922. Serial No. 594,058.

*To all whom it may concern:*

Be it known that I, RAYMOND C. BENNER, a citizen of the United States, residing at Bayside, in the county of Queens and State of New York, have invented certain new and useful Improvements in Storage-Cell Electrodes and Supports for Active Materials, of which the following is a specification.

This invention relates to supports for the active material of storage cells. An important object of the invention is to provide light weight, non-conductive supports especially adapted for use in hand lamps or other battery-operated devices.

Light weight insulating materials have heretofore been used in the manufacture of active material supports, as by the substitution of such supports for lead grids the weight of the cell is materially reduced. In accordance with the present invention improved non-conductive supports, comprising members arranged radially around a central vertical axis, are provided. The improved supports will in general carry both positive and negative active materials in the separate compartments defined by the radial members.

Reference is to be made to the accompanying drawing, in which

Fig. 1 is a perspective view of the support;

Fig. 2 is a horizontal section on line II—II, Fig. 1, showing the active material in position;

Fig. 3 is a side elevation, partly broken away, showing the application of a perforated celluloid coating to the active material; and Fig. 4 is a horizontal section through a modified form of support.

In the drawing, reference numerals 1, 2, 3, and 4 denote non-conductive strips arranged radially about a central axial line. The symmetrical arrangement of four strips as shown is preferred, but the number and disposition of the strips may be varied as desired. The strips may be made of wood, celluloid, rubber or any other non-conductive material capable of resisting the action of the electrolyte.

Conductive members 5 and 6, for example lead ribbons, are arranged in the angles of the compartments formed by the intersection of strips 1, 2, 3, and 4. The bodies of negative active material 7, 7', and of positive active material 8, 8', are preferably placed in diametrically opposite compartments. Conductor 5 lies between strips 2 and 3, is passed through perforation 9 at the intersection of the strips, and is extended upwardly between strips 1 and 4, thus electrically connecting both bodies of positive active material. The upper ends of both branches of conductor 5 are connected to terminal 10. In a similar manner conductor 6 connects the negative materials, passing through perforation 11 and being connected to terminal 12 at the bottom of the support.

In the construction described, the active material completely covers the lead conductors, which results in materially decreasing the rate of loss of charge while on shelf, probably through the elimination of the local action commonly caused by surface exposure of metal in contact with active material.

The form of the invention illustrated in Fig. 3 is similar to that already described, but the active material is covered by a layer or coating 13 of protective material permeable by electrolyte. A perforated celluloid jacket may be used with advantage. Celluloid caps 14 and 14' may be secured to the bottom and top of the support. These caps may be used either with or without the lateral protective coating 13 and are useful as retaining and strengthening means, especially when the support is made of wood.

The support shown in Figs. 1, 2, and 3 may be formed from thin celluloid sheets secured together by cementing or in any other suitable way. Other materials, for example wood, are also well adapted for this purpose. Fig. 4 shows a section through a wooden support in which the radial members 15 are curved outwardly at the ends for securely holding the blocks of active material in place.

I am aware that it has been proposed to place both positive and negative active materials upon the same non-conductive support, the materials being adjacent and having their surfaces in the same plane. In such constructions current leakage between the active bodies of opposite polarity is a frequent disadvantage. Such leakage is reduced in the present devices by the angular relation of the active surfaces. Further advantages reside in the light weight and compactness of the support and the simplicity of its assembly. These and other advantages of the invention are not necessarily dependent upon the specific forms illustrated herein, and various modifications of such forms may be made within the scope of the appended claims.

I claim:—

1. An active material support comprising non-conductive members arranged radially about a common axis and forming compartments for the active material.

2. An electrode comprising non-conductive members arranged radially about a common axis and forming compartments, terminals, a conductor in each compartment and connected to the appropriate terminal, and active material in the compartments and covering the conductors.

3. An electrode comprising celluloid strips arranged radially at right angles about a common axis to form pairs of diametrically opposite compartments, active material of opposite polarity in each pair of compartments, terminals, and means for electrically connecting the active materials with the terminals.

4. An electrode comprising a supporting member and adjacent bodies of active material of opposite polarity carried thereby, each of said bodies having its exposed surface arranged in angular relation to the surface of the adjacent bodies.

5. The invention according to claim 4, in which the active material is covered by a protective coating permeable by electrolyte.

6. The invention according to claim 4, in which each end of the supporting member is covered by a cap of insulating material.

In testimony whereof, I affix my signature.

RAYMOND C. BENNER.